United States Patent [19]

Watanabe

[11] Patent Number: 5,554,801
[45] Date of Patent: Sep. 10, 1996

[54] DIAGNOSIS APPARATUS AND METHOD FOR A CYLINDER PRESSURE SENSOR

[75] Inventor: Satoru Watanabe, Atsugi, Japan

[73] Assignee: Unisia Jecs Corporation, Atsugi, Japan

[21] Appl. No.: 489,716

[22] Filed: Jun. 13, 1995

[30] Foreign Application Priority Data

Jun. 14, 1994 [JP] Japan ................................... 6-131660

[51] Int. Cl.⁶ ................................................ G01M 15/00
[52] U.S. Cl. ............................................... 73/115; 73/4 R
[58] Field of Search ......................... 73/115, 4 R, 117.3, 73/35; 123/425

[56] References Cited

U.S. PATENT DOCUMENTS

| | | | |
|---|---|---|---|
| 4,962,738 | 10/1990 | Iwata ........................................ | 123/425 |
| 5,024,191 | 6/1991 | Nagahiro et al. ......................... | 123/198 |
| 5,125,267 | 6/1992 | Kuroda et al. ............................ | 73/115 |
| 5,168,854 | 12/1992 | Hashimoto et al. ...................... | 73/115 |
| 5,276,625 | 1/1994 | Nakaniwa ................................. | 73/115 |
| 5,351,528 | 10/1994 | Fukui et al. .............................. | 73/115 |

FOREIGN PATENT DOCUMENTS

| | | |
|---|---|---|
| 63-17432 | 2/1988 | Japan . |
| 4-81557 | 3/1992 | Japan . |
| 4-224275 | 8/1992 | Japan . |

*Primary Examiner*—Richard Chilcot
*Assistant Examiner*—Max Noori
*Attorney, Agent, or Firm*—Foley & Lardner

[57] ABSTRACT

Conditions where there is inertial rotation of an engine after switching off an ignition switch, and an opening of a throttle valve disposed in an intake system of the engine is constant, are made diagnosis conditions. When these diagnosis conditions are established, cylinder pressures detected by a cylinder pressure sensor are integrated over a predetermined integral interval, and when the integral value is less than a previously set reference value, this is considered as an abnormality in the output due to a sensor fault, and a fault judgment signal for the cylinder pressure sensor is output.

8 Claims, 4 Drawing Sheets

DIAGNOSIS APPARATUS AND METHOD FOR A CYLINDER PRESSURE SENSOR

FIELD OF THE INVENTION

The present invention relates to a diagnosis apparatus and method for a cylinder pressure sensor. More particularly, the present invention relates to technology for carrying out fault diagnosis of a cylinder pressure sensor, based on a detection signal occurring at a time of non-combustion of an engine.

DESCRIPTION OF THE RELATED ART

A known method for gaining an understanding of the combustion conditions of an internal combustion engine involves detecting the pressure of combustion gases inside the cylinder (refer to Japanese Unexamined Patent Publication No. 4-224275).

With such a method, however, if a fault occurs in the cylinder pressure sensor provided for detecting the pressure of the combustion gases, there is the likelihood of an erroneous understanding of the combustion conditions.

It is thus desirable to provide a method of diagnosing a fault in the cylinder pressure sensor. A method, which has been considered for diagnosing abnormalities in a cylinder pressure sensor output level without influence from combustion fluctuations, involves diagnosis based on an output of the sensor during so-called deceleration fuel cut-off.

However, with diagnosis during deceleration fuel cut-off, it is difficult to make a very accurate fault diagnosis due to the significant change in cylinder pressure which accompanies the large change in engine boost resulting from a drop in the engine rpm during fuel cut-off.

SUMMARY OF THE INVENTION

In view of the above problem, it is an object of the present invention to provide a diagnosis apparatus and method that can make a very accurate fault diagnosis of a cylinder pressure sensor, based on the sensor output during non-combustion conditions of an engine.

To achieve the above object, the diagnosis apparatus and method for a cylinder pressure sensor according to the present invention includes, detecting as a diagnosis condition, inertial rotation of a crankshaft of an engine (hereafter "engine" for brevity) after switching off an ignition switch, and when such a diagnosis condition is established, determining the presence or absence of a fault in the cylinder pressure sensor based on a current detection signal of the cylinder pressure sensor, and outputting a fault diagnosis signal.

With such a construction, fault diagnosis is made based on a detection signal of the cylinder pressure sensor during inertial rotation of the engine from after switching off the ignition switch until the engine comes to a stop. During this period the engine rpm is generally low so that the boost fluctuations are relatively small, and also with the non-combustion condition of the engine, the cylinder pressure is relatively stable. It is therefore possible to determine to a good accuracy whether or not the cylinder pressure sensor is outputting a desired detection signal.

Here, the diagnosis condition may be that there is inertial rotation of the engine after switching off the ignition switch, and that an opening of a throttle valve disposed in an intake system of the engine is constant.

If the throttle is operated during inertial rotation of the engine, there is the likelihood of a boost change, with consequent fluctuations in cylinder pressure. Therefore, in order to maintain diagnosis accuracy, diagnosis is only made when the throttle is not being operated and its opening is constant.

Moreover, the construction may be such that during a predetermined period after switching off the ignition switch, the engine operation is forcibly continued, and during this forcible continuance of the engine operation an opening of an auxiliary air quantity adjustment valve disposed in an auxiliary air passage provided for bypassing a throttle valve, is forcibly controlled to a predetermined opening, and inertial rotation of the engine after the forcible continuance of the engine operation is made a diagnosis condition.

With such a construction, by continuing operation of the engine for a certain period rather than immediately allowing the engine to stop at the same time as switching off the ignition switch, and forcibly controlling the opening of the auxiliary air quantity adjustment valve to a predetermined opening during the continuing operation, the engine can be allowed to stop from a relatively high constant rpm condition. The operating condition for diagnosis can therefore be stabilized and the period of inertial rotation ensured, enabling the opportunity for diagnosis to be reliably obtained.

With regards to the fault diagnosis, the construction may involve integrating detection signals of the cylinder pressure sensor over a predetermined integral interval for each single combustion cycle, and outputting a fault judgment signal for the cylinder pressure sensor when an integral value of the detection signals is less than a predetermined reference value.

With such a construction wherein diagnosis is made based on an integral value of the detection signals rather than a momentary value of a detection signal, the diagnosis can be made without influences from noise and the like.

Further objects and aspects of the present invention will become apparent from the following description of embodiments given in conjunction with the appended drawings.

DESCRIPTION OF THE PREFERRED EMBODIMENTS

Following is a description of embodiments of the present invention.

Figure 2:
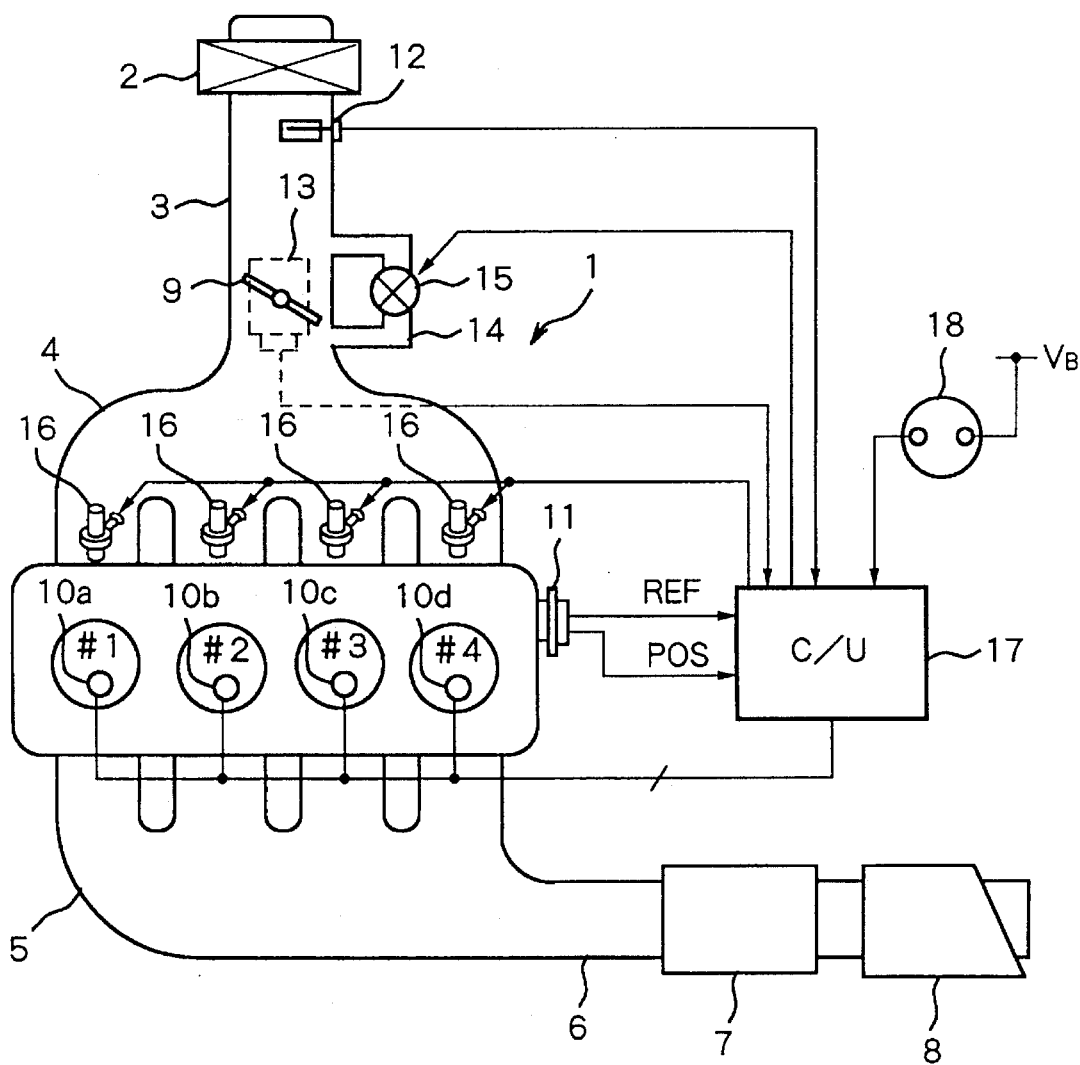
FIG. 2 is a schematic system diagram illustrating an embodiment of the present invention.

In FIG. 2, which illustrates an embodiment of the present invention, an engine 1 draws in air by way of an air cleaner 2, a throttle chamber 3 and an intake manifold 4. Exhaust gases from the engine 1 are discharged to the atmosphere by way of an exhaust manifold 5, an exhaust duct 6, a three way catalytic converter 7 and a muffler 8.

The throttle chamber 3 is provided with a throttle valve 9 which opens/closes, and which is connected to an accelerator pedal (not shown). The throttle valve 9 enables adjustment of an intake air quantity of the engine 1.

Cylinder pressure sensors 10a~10d are provided for each of the cylinders (#1~#4).

For the cylinder pressure sensors 10a~10d, a type that is fitted as a washer for an ignition plug (not shown), such as disclosed in Japanese Unexamined Utility Model Publication No. 63-17432 is used. More specifically, the cylinder pressure sensors 10a~10d are made from a piezo-electric element or electrode formed into a ring shape, which ring shaped sensor is clamped between the ignition plug and the cylinder head (ignition plug attachment). The sensor detects a cylinder pressure change, as the load on the sensor changes in accordance with a displacement of the ignition plug due to cylinder pressure.

The cylinder pressure sensors 10a~10d, however, are not limited to the abovementioned washer type, and may for example comprise types such as disclosed in Japanese Unexamined Patent Publication No. 4-81577 where a sensor portion faces directly into the combustion chamber to detect the cylinder pressure as an absolute value.

A crank angle sensor 11 is provided on a cam shaft (not shown) of the engine 1, for detecting a crank angle from rotation of the cam shaft.

The crank angle sensor 11 respectively outputs a reference angle signal REF for each 180° crank angle (which corresponds to the stroke phase difference between cylinders in the four cylinder engine 1 of the embodiment), and outputs a unit angle signal POS for each unit crank angle (1° or 2°).

The reference angle signal REF is for discriminating between cylinders, and may involve for example a detection signal corresponding to at least one specific cylinder, which can be distinguished from another detection signal by means of for example the pulse width.

An airflow meter 12 is provided upstream of the throttle valve 9 for detecting the intake air quantity Q of the engine 1. The throttle valve 9 is provided with a potentiometer type throttle sensor 13 (opening detection device) for detecting the throttle valve opening TVO.

An auxiliary air passage 14 is provided which bypasses the throttle valve 9. A solenoid type auxiliary air quantity adjustment valve 15 having an opening/closing thereof duty controlled by means of a control unit 17 provided for engine control, is disposed in the auxiliary air passage 14.

Solenoid type fuel injection valves 16 are provided for each cylinder in respective branch portions of the intake manifold 4. The fuel injection valves 16 are controlled to open and close in accordance with an injection pulse signal from the control unit 17, so as to intermittently inject fuel which has been controlled to a predetermined pressure by means of a pressure regulator (not shown).

Detection signals from the cylinder pressure sensors 10a~10d, the crank angle sensor 11, the airflow meter 12, and the throttle sensor 13, and an on/off signal from an ignition switch 18, are input to the control unit 17.

The control unit 17, which incorporates a microcomputer, controls the injection quantity (injection pulse width) of the fuel injection valves 16, based on the outputs from the respective sensors, to produce a mixture having a predetermined air-fuel ratio. Moreover, it adjusts the auxiliary air quantity drawn into the engine by way of the auxiliary air passage 14 by controlling the opening of the auxiliary air quantity adjustment valve 15 using a duty determined for example from, a basic duty based for example on the cooling water temperature of the engine 1, and a feedback correction duty for making the engine rpm during idle operation coincide with a target speed.

Furthermore, the control unit 17 carries out misfire diagnosis for each cylinder based on the combustion pressure for each cylinder detected by the cylinder pressure sensors 10a~10d. More specifically, the detection signals of the cylinder pressure sensors 10a~10d are sampled at regular crank angles within a predetermined integral interval (for example from 10° BTDC to 100° ATDC, or from TDC to 110° ATDC) for each single combustion cycle for each cylinder, and the sampled values integrated to obtain the indicated mean effective pressure IMEP. Any drop in combustion pressure due to misfire is then judged by comparing the integral value IMEP with a reference value set in accordance with an engine operating condition. The presence or absence of misfire for each cylinder can thus be detected.

Here, if a fault (including deterioration) occurs in a cylinder pressure sensor 10a~10d, there is a drop in combustion pressure detection accuracy, so that misfire diagnosis accuracy deteriorates. The control unit 17 therefore carries out a fault diagnosis of the cylinder pressure sensors 10a~10d as illustrated by the flow chart of FIG. 3.

Figure 1:
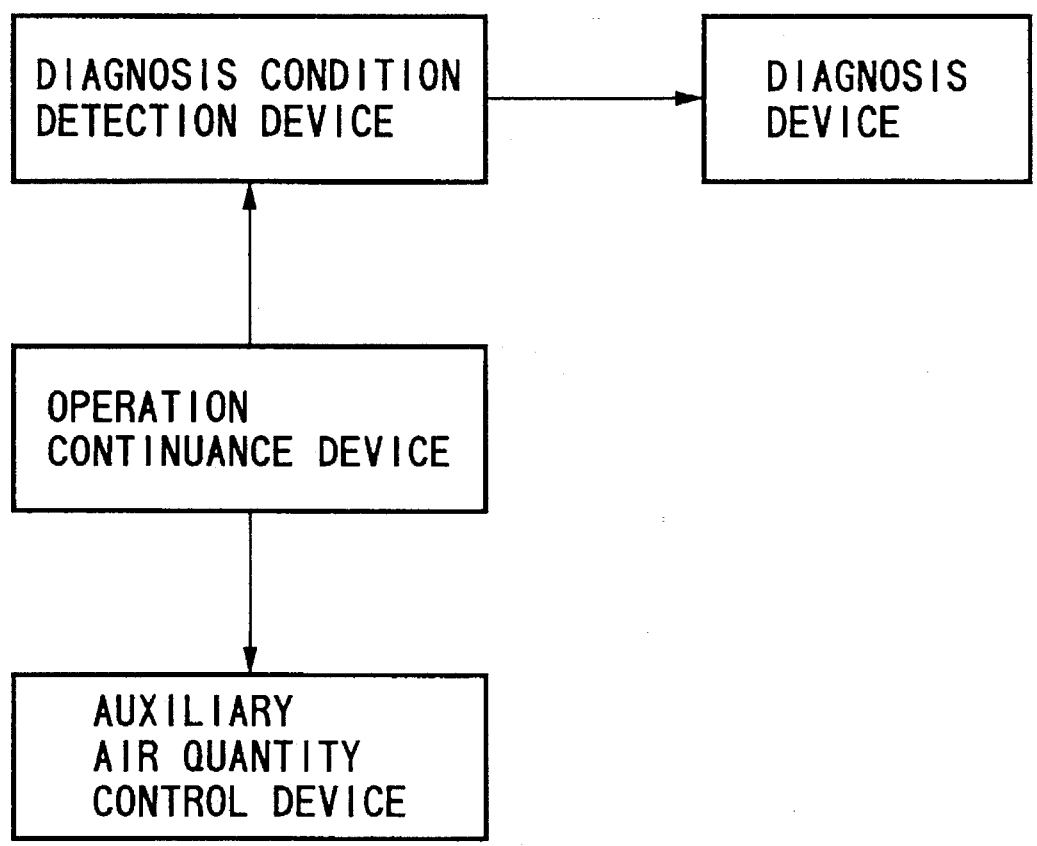
FIG. 1 is a block diagram showing a basic construction of a diagnosis apparatus according to the present invention.
Figure 3:
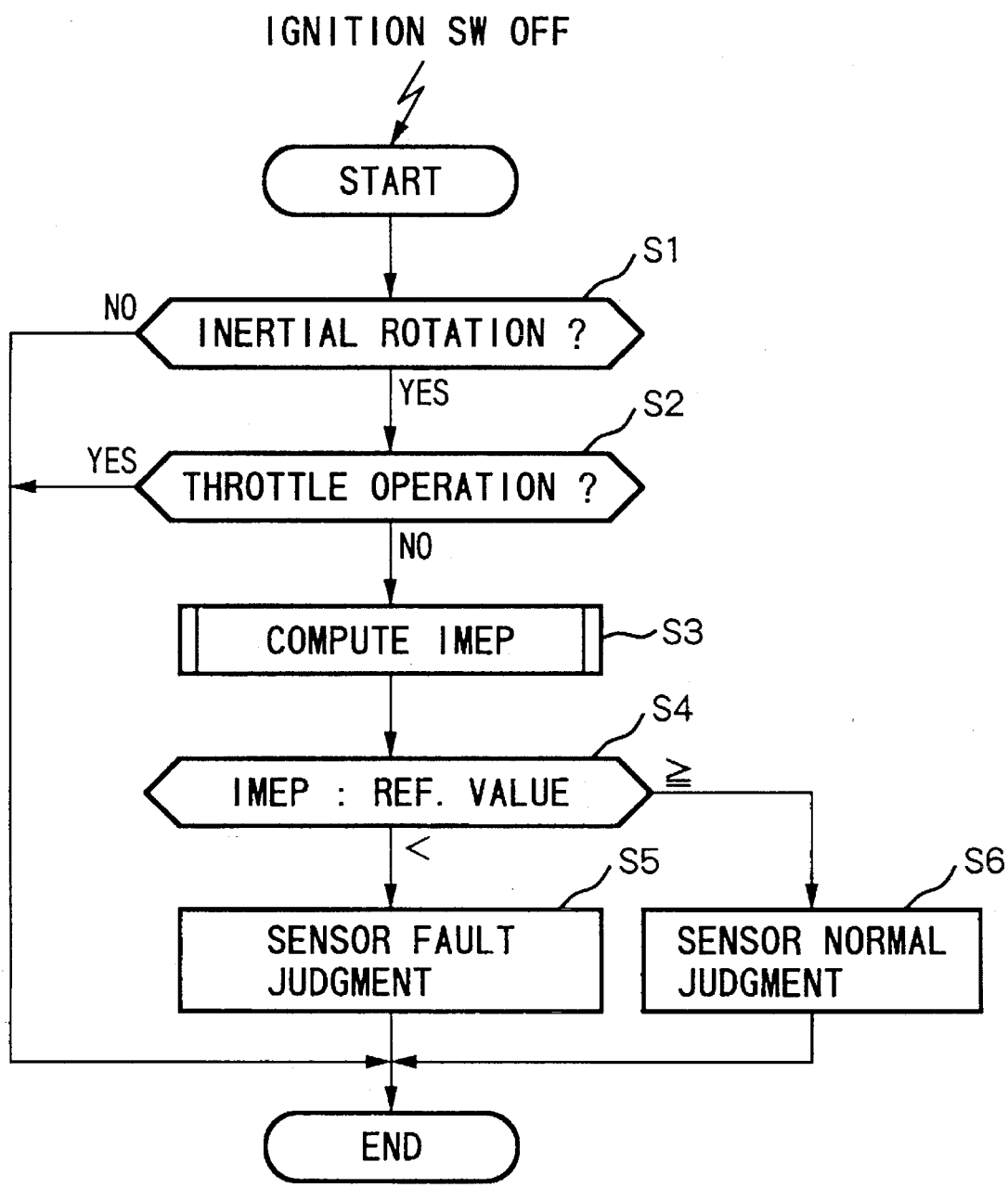
FIG. 3 is a flow chart illustrating a first embodiment of a fault diagnosis routine according to the invention.

With the present embodiment, the functions of a diagnosis condition detection device, and a diagnosis device (see FIG. 1) are realized by software illustrated by the flow chart of FIG. 3 and stored in the control unit 17.

The flow chart of FIG. 3 shows a routine that is interrupt executed with the switching of the ignition switch 18 from on to off (referred to hereunder simply as switching off). When the ignition switch 18 is switched off, then initially in step 1 (with "step" denoted by S in the figures) it is judged if the engine 1 is rotating under inertia.

When the ignition switch 18 is switched off, fuel injection from the fuel injection valves 16 and the firing of the ignition plugs (not shown) is stopped, so that the engine 1 rotates for a certain interval under inertia and then stops. In step 1, the presence of this interval from after switching off the ignition switch 18 until engine rotation actually stops is judged based on a rotation signal from the crank angle sensor 11.

When judged that the engine 1 is rotating under inertia, control proceeds to step 2 where it is judged if the throttle is being operated (throttle valve opening TVO changing or not) based on the throttle valve opening TVO detected by the throttle sensor 13.

With the present embodiment, fault diagnosis of the cylinder pressure sensors 10a~10d is carried out during inertial rotation of the engine 1 by determining whether or not an output corresponding to the actual cylinder pressure occurring under non-combustion conditions is being output from the cylinder pressure sensors 10a~10d. Since fault diagnosis accuracy suffers with fluctuations in the actual cylinder pressure a constant throttle valve opening as a result of the throttle operation which is the cause of boost fluctuations (cylinder pressure fluctuations) being not present, is made as a diagnosis condition.

The condition where the throttle valve opening is constant may be a condition where the throttle valve 9 is held fully closed, or one wherein the throttle valve opening TVO is constant at an intermediate opening. However, since it is common, in general, for the throttle valve 9 to be held fully closed, the judgment of step 2 can be omitted thus simplifying the diagnosis control routine.

When verified in step 2 that the throttle is not being operated, then in the next step 3, the detection signals from the cylinder pressure sensors 10a~10d are sampled, as for when diagnosing misfire, over a predetermined integral interval and then integrated to compute the cylinder pressure integral value IMEP.

In step 4, the integral value IMEP and a reference value previously set based on the actual cylinder pressure occurring during inertial rotation immediately prior to the engine stopping are compared.

When the integral value IMEP computed during inertial operation is less than the reference value, it is considered that an abnormality has occurred in one or other of the sensors resulting in an output characteristic lower than expected. In this case control proceeds to step 5 where judgment of a fault in the relevant cylinder pressure sensor 10a~10d is made, and a fault judgment signal output. Then, based on the fault judgment signal, a fail safe operation such as inhibiting misfire diagnosis using the cylinder pressure sensor 10a~10d judged to be faulty, is executed.

On the other hand, when judged in step 4 that the integral value IMEP is greater than or equal to the reference value, it is determined that at least there is no drop in output due to a fault (including deterioration). Control thus proceeds to step 6 where the cylinder pressure sensors 10a~10d are judged to be normal, and a normal judgment signal output. Then, based on the normal judgment signal, misfire diagnosis using the cylinder pressure sensors 10a~10d judged to be normal, is continuously permitted.

During inertial rotation, non-combustion conditions exist so that the sensor output can be determined without influence from combustion fluctuations. Moreover at the time of inertial rotation after switching off the ignition switch 18, since the engine rpm is sufficiently low compared for example to that at the time of deceleration fuel cut-off, boost fluctuations due to rpm fluctuations (cylinder pressure fluctuations) are sufficiently small. Fault diagnosis can thus be made with good accuracy by comparing the cylinder pressure detection results from the sensors with a fixed reference value. Moreover, by having as a condition for diagnosis, where the throttle valve opening during inertial rotation is constant, fault diagnosis can be carried out at conditions wherein the cylinder pressure is even more stable.

With the present embodiment, the construction is such that the detection values of the cylinder pressure sensors 10a~10d during inertial rotation after switching off the ignition switch 18 are integrated, and fault diagnosis is made based on the integral value. However, a construction is also possible wherein diagnosis is made using for example the peak values of the cylinder pressures detected by the cylinder pressure sensors 10a~10d, or the values detected at a predetermined crank angle position. However, if, as with the present embodiment, the detection values are integrated over a predetermined integral interval, the integral value will not vary widely due to the noise component. Hence, the undesirable influence of noise on the diagnosis can be minimized.

With the above described embodiment, the construction is such that the fuel control and ignition control are normally terminated with switching off the ignition switch 18, and fault diagnosis of the cylinder pressure sensors 10a~10d is made under the inertial rotation conditions at this time. However, with a second embodiment illustrated by the flow chart of FIG. 4, constant conditions may be forcibly created before proceeding to inertial rotation, so that the fault diagnosis of the cylinder pressure sensors 10a~10d can be carried out under stabilized conditions.

Figure 4:
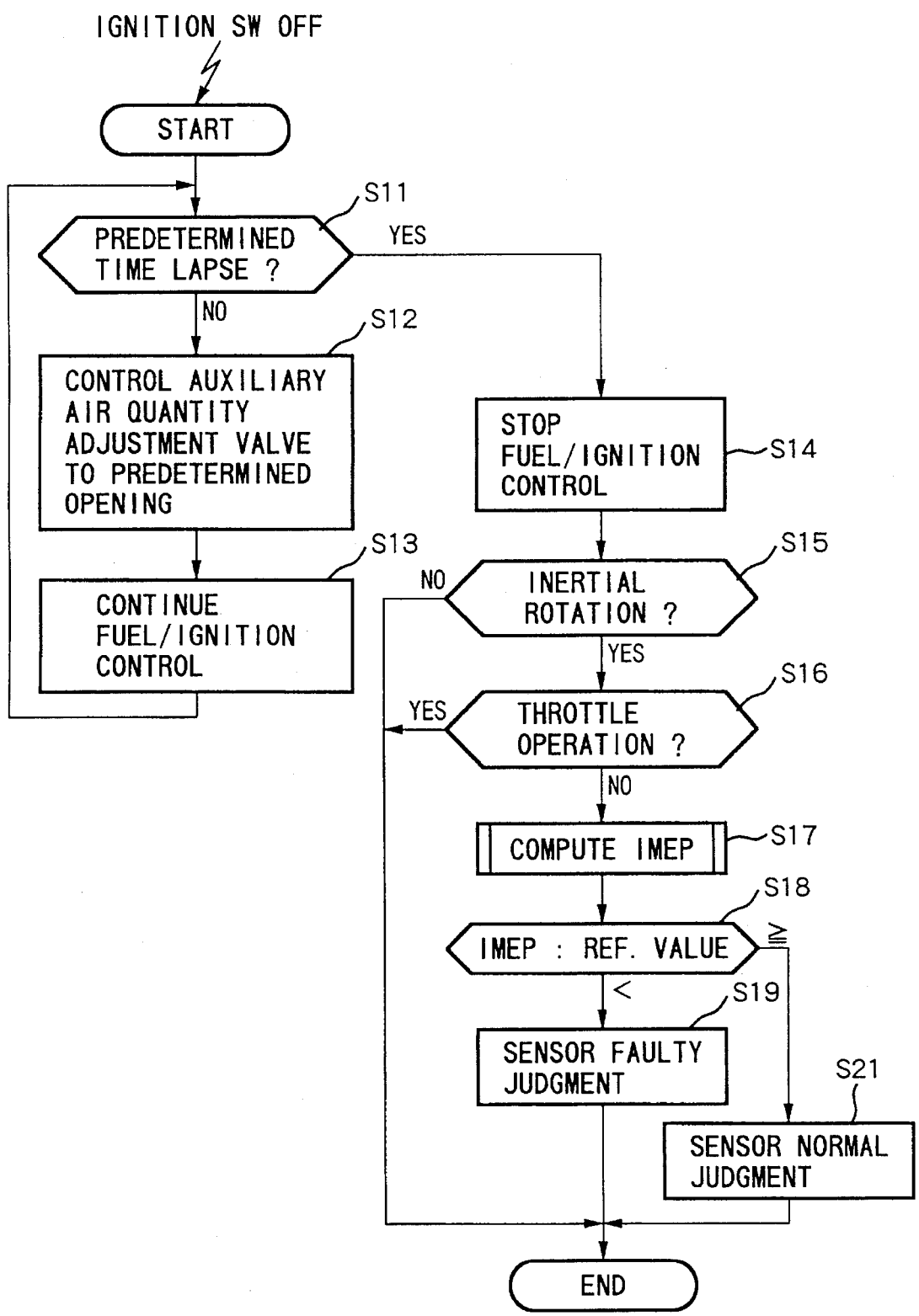
FIG. 4 is a flow chart illustrating a second embodiment of a fault diagnosis routine according to the invention.

With the second embodiment, the functions of a diagnosis condition detection device, a diagnosis device, an operation continuance device, and an auxiliary air quantity control device (see FIG. 1) are realized by software illustrated by the flow chart of FIG. 4 and stored in the control unit 17.

The flow chart of FIG. 4 shows a routine which is interrupt executed with switching off the ignition switch 18. Initially in step 11 it is judged if a predetermined time has elapsed from switching off the ignition switch 18.

If the predetermined time has not elapsed, control proceeds to step 12 where the opening of the auxiliary air quantity adjustment valve 15 is forcibly controlled to a previously set predetermined opening X. Moreover, in the next step 13, the fuel control and ignition control are forcibly continued so that the engine continues to operate.

The opening X is set to an opening that is larger than that for normal control, so that the engine rpm increases by a certain amount, and operation continues for a predetermined time.

Once the engine rpm has been increased and the engine operation forcibly continued for the predetermined time after switching off the ignition switch 18, control proceeds from step 11 to step 14 where fuel control and ignition control is first terminated.

Then in step 15, 16, it is verified that there is inertial rotation, and the throttle opening is constant. When these diagnosis conditions are established control proceeds to step 17. In step 17, the cylinder pressures detected by the cylinder pressure sensors 10a~10d are sampled as mentioned before over a predetermined integral interval, and then integrated to compute the integral value IMEP.

In step 18, the integral value IMEP computed in step 17 and a reference value are compared. When the integral value IMEP is less than the reference value, control proceeds to step 19 where judgment of a fault in the relevant cylinder pressure sensor 10a~10d is made, and a fault judgment signal output. On the other hand, when judged in step 18 that the integral value IMEP is greater than or equal to the reference value, control proceeds to step 20 where the cylinder pressure sensors 10a~10d are judged to be normal, and a normal judgment signal output.

As described above, if the engine operation is forcibly continued even when the ignition switch 18 is switched off, and the opening of the auxiliary air quantity adjustment valve 15 at this time controlled to be constant, the operating conditions prior to proceeding to inertial rotation can be stabilized. Therefore, the operating conditions under inertial rotation, which is operating conditions at the time of carrying out diagnosis, can be stabilized. Moreover, the engine rpm can be controlled to increase before proceeding to inertial rotation, so that the interval for carrying out diagnosis under inertial rotation can be maintained.

I claim:

1. A diagnosis apparatus for a cylinder pressure sensor comprising:

diagnosis condition detection means for detecting as a diagnosis condition whether a crankshaft of an engine is rotating after switching off an ignition switch, and diagnosis means for determining, when said diagnosis condition detection means detects rotation of the engine crankshaft after switching off the ignition switch, the presence or absence of a fault in the cylinder pressure sensor based on a current detection signal of the cylinder pressure sensor, and outputting a fault diagnosis signal.

2. A diagnosis apparatus for a cylinder pressure sensor according to claim 1, further comprising an opening detection means for detecting an opening of a throttle valve disposed in an intake system of the engine, wherein said diagnosis determination means determines the presence or absence of a fault in the cylinder pressure sensor when said diagnosis condition detection means detects rotation of the engine crankshaft after switching off the ignition switch and said opening detection means detects that the throttle valve opening is constant.

3. A diagnosis apparatus for a cylinder pressure sensor according to claim 1, further comprising an operation continuance means for forcibly continuing engine operation during a predetermined period after switching off the ignition switch and auxiliary air quantity control means for forcibly controlling to a predetermined opening, during continuance of the engine operation by said operation continuance means, an opening of an auxiliary air quantity adjustment valve disposed in an auxiliary air passage provided for bypassing a throttle valve, wherein said diagnosis condition detection means detects rotation of the engine crankshaft after the forcible continuance of the engine operation by said operation continuance means.

4. A diagnosis apparatus for a cylinder pressure sensor according to claim 1, wherein said diagnosis detection means integrates detection signals of said cylinder pressure sensor over a predetermined integral period for each single combustion cycle, and outputs a fault judgment signal for the cylinder pressure sensor when an integral value of said detection signals is less than a predetermined reference value.

5. A diagnosis method for a cylinder pressure sensor comprising:

detecting as a diagnosis condition whether a crankshaft of an engine is rotating after switching off an ignition switch, determining, when rotation of the engine crankshaft is detected after switching off the ignition switch, the presence or absence of a fault in the cylinder pressure sensor based on a current detection signal of the cylinder pressure sensor, and outputting a fault diagnosis signal.

6. A method for a cylinder pressure sensor according to claim 5, further comprising detecting an opening of a throttle valve disposed in an intake system of the engine, and determining the presence or absence of a fault in the cylinder pressure sensor when rotation of the engine crankshaft after switching off the ignition switch is detected and the detected opening of the throttle valve is constant.

7. A diagnosis method for a cylinder pressure sensor according to claim 5, further comprising forcibly continuing the engine operation during a predetermined period after switching off the ignition switch, forcibly controlling an opening of an auxiliary air quantity adjustment valve, which is disposed in an auxiliary air passage provided for bypassing a throttle valve, to a predetermined position during this forcible continuance of the engine operation, and detecting rotation of the engine crankshaft after the forcible continuance of the engine operation.

8. A diagnosis method for a cylinder pressure sensor according to claim 5, wherein the step for diagnosing a fault includes integrating detection signals of said cylinder pressure sensor over a predetermined integral period for each single combustion cycle, and outputting a fault judgment signal for the cylinder pressure sensor when an integral value of said detection signals is less than a predetermined reference value.

* * * * *